(12) United States Patent
Anello

(10) Patent No.: US 10,494,979 B2
(45) Date of Patent: Dec. 3, 2019

(54) VEHICLE EXHAUST AFTERTREATMENT SUPPORT DESIGN

(71) Applicant: International Truck Intellectual Property Company, LLC, Lisle, IL (US)

(72) Inventor: Anthony M. Anello, Bartlett, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 2 days.

(21) Appl. No.: 16/016,814

(22) Filed: Jun. 25, 2018

(65) Prior Publication Data

US 2018/0306094 A1    Oct. 25, 2018

(51) Int. Cl.
*F16F 15/00* (2006.01)
*F01N 13/18* (2010.01)
*F16C 33/08* (2006.01)

(52) U.S. Cl.
CPC .......... *F01N 13/1805* (2013.01); *F16C 33/08* (2013.01); *F01N 2450/24* (2013.01)

(58) Field of Classification Search
CPC ............. F16F 15/04; F16F 7/00; F16F 1/3849
USPC ........ 248/560, 580, 581, 608, 609, 634, 635
See application file for complete search history.

(56) References Cited

U.S. PATENT DOCUMENTS

| | | | |
|---|---|---|---|
| 4,550,795 A * | 11/1985 | Teshima ................ | B60K 13/04 180/296 |
| 5,908,187 A * | 6/1999 | Kalkoske .............. | F16L 55/035 248/60 |
| 6,705,427 B2 * | 3/2004 | Kaku ....................... | F16F 1/52 181/207 |
| 8,875,500 B2 * | 11/2014 | Bednarz ................ | E02F 9/0866 248/201 |
| 2008/0142647 A1 * | 6/2008 | Connelly .............. | F16L 55/035 248/74.1 |
| 2010/0314504 A1 * | 12/2010 | Dickinson ........... | F01N 13/1811 248/74.1 |

* cited by examiner

*Primary Examiner* — Steven M Marsh
(74) *Attorney, Agent, or Firm* — Jeffrey P. Calfa; Mark C. Bach; Chastity Bailey

(57) ABSTRACT

An exhaust aftertreatment interface comprises aftertreatment device assembly and first and second mounting brackets attached to the aftertreatment device assembly. First and second apertures are disposed on the mounting brackets. First and second bushings are disposed in the apertures. A fastener is disposed through the bushings.

5 Claims, 2 Drawing Sheets

VEHICLE EXHAUST AFTERTREATMENT SUPPORT DESIGN

BACKGROUND

Embodiments disclosed herein relate generally to supporting an exhaust aftertreatment device on a vehicle, such as a truck and the like. Embodiments disclosed herein include a method for manufacturing a vehicle having an exhaust aftertreatment device.

SUMMARY

An embodiment of an exhaust aftertreatment interface disclosed herein comprises an aftertreatment device assembly. A first mounting bracket is attached to the aftertreatment device assembly. A second mounting bracket is attached to the aftertreatment device assembly. A first aperture is disposed on the first mounting bracket. A second aperture is disposed on the second mounting bracket. A first bushing is disposed in the first aperture. A second bushing is disposed in the second aperture. A fastener is disposed through the first bushing and the second bushing.

DETAILED DESCRIPTION

Figure 1:
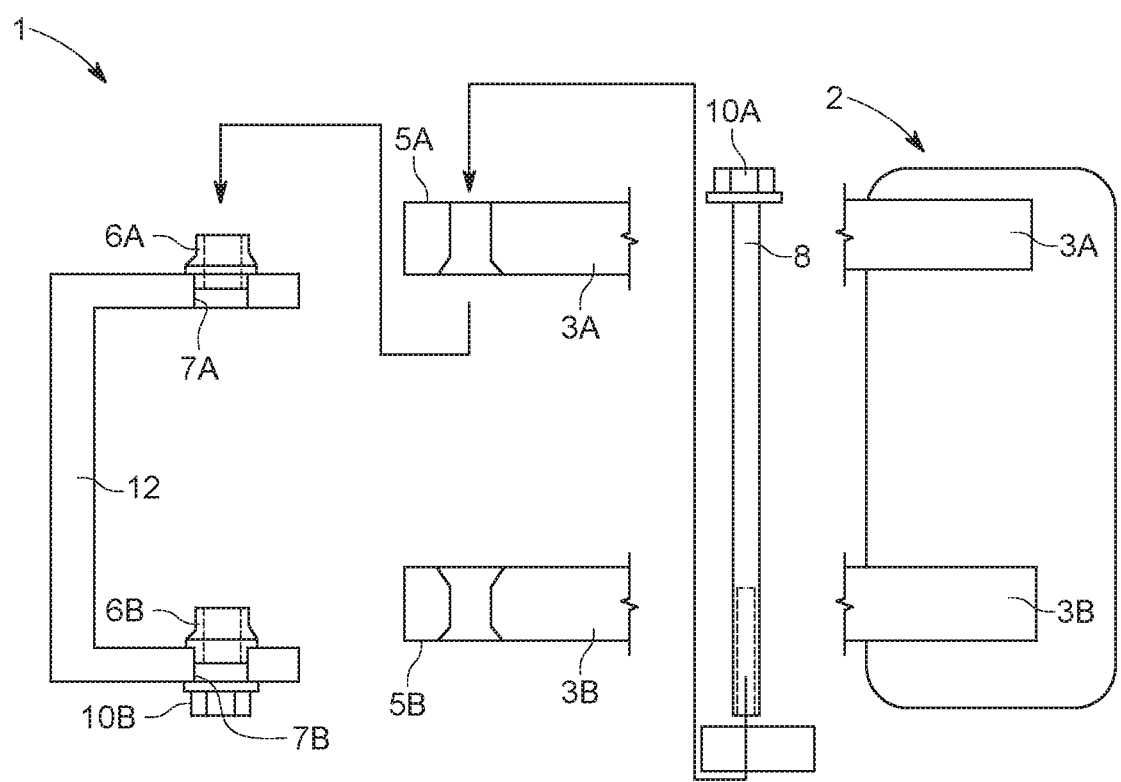
FIG. 1 is an exploded view of an embodiment of an exhaust aftertreatment mounting interface disclosed herein.
Figure 2:
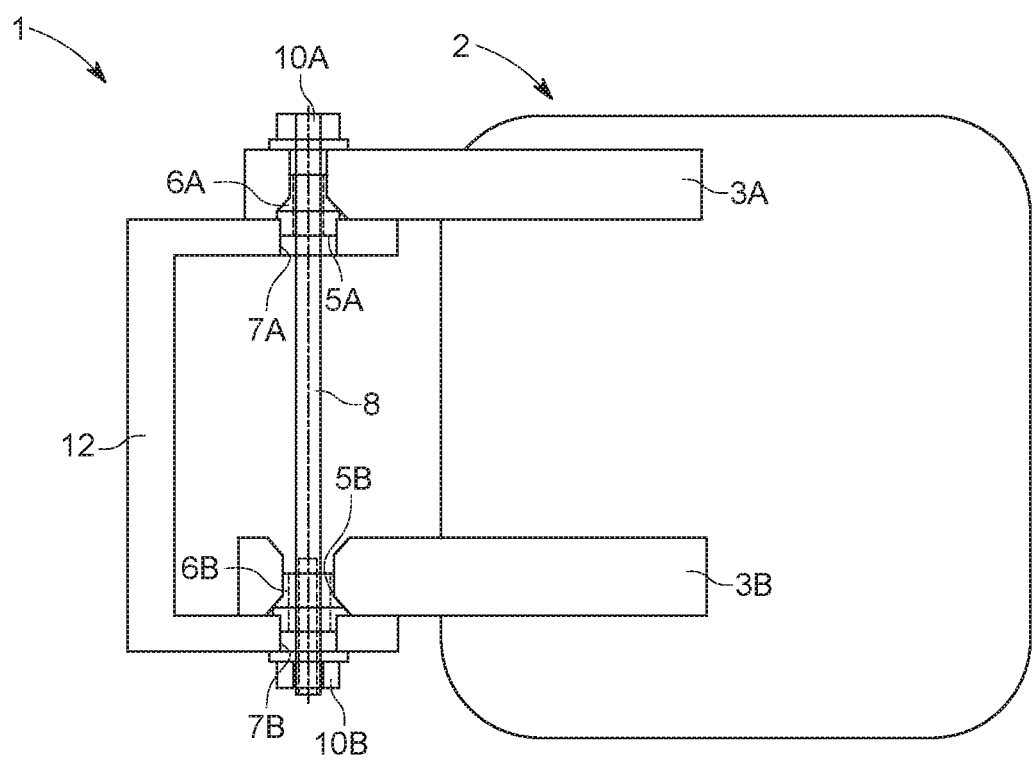
FIG. 2 is an assembled view of the embodiment of FIG. 1.

Elements of an embodiment of an exhaust aftertreatment mounting interface 1 are listed below and correspond to the drawings accompanying this patent application. Specifically, which correspond to the numbers on FIG. 1 and FIG. 2, are listed herein:
Number 1: Exhaust aftertreatment mounting interface
Number 2: Aftertreatment device assembly
Number 3A: First mounting bracket
Number 3B: Second mounting bracket
Number 5A: First aperture
Number 5B: Second aperture
Number 6A: First bushing
Number 6B: Second bushing
Number 7A: First aperture on the frame 12
Number 7B: Second aperture on the frame 12
Number 8: Fastener
Number 10A: Torque-accepting device
Number 10B: Torque-accepting device
Number 12: Frame FIG. 1 is an exploded view of an embodiment of an exhaust aftertreatment mounting interface 1 disclosed herein. A first mounting bracket 3A is attached to an aftertreatment device assembly 2 and a second mounting bracket 3B is attached to the aftertreatment device assembly 2 opposite to the first mounting bracket 3A. A first aperture 5A is disposed on the first mounting bracket 3A at an end thereof opposite to the aftertreatment device assembly 2. A second aperture 5B is disposed on the second mounting bracket 3B at an end thereof opposite to the aftertreatment device assembly 2. In some embodiments of the exhaust aftertreatment mounting interface 1, the first mounting bracket 3A and the second mounting bracket 3B may comprise a single mounting bracket.

A frame 12 is mounted to a vehicle (not shown for clarity), such as a diesel-powered vehicle and the like, that utilizes an exhaust aftertreatment device included in the aftertreatment device assembly 2. The frame 12 includes a first aperture 7A and a second aperture 7B disposed opposite to the first aperture 7A. A first bushing 6A is disposed in the first aperture 7A. A second bushing 6B is disposed in the second aperture 7B. The first bushing 6A includes a shape that corresponds to a shape of a portion of the first aperture 5A. A second bushing 6B is disposed in the second aperture 7B. The second bushing 6B includes a shape that corresponds to a shape of a portion of the second aperture 7B.

The first aperture 5A includes a shape that corresponds to the shape of the first bushing 6A. The second aperture 5B includes a shape that corresponds to the shape of the second bushing 6B. In this manner, the first bushing 6A and the second bushing 6B facilitate alignment of the aftertreatment device assembly 2 with the frame 12, and thereby the vehicle. This arraignment can reduce difficulties in constructing a vehicle. In some embodiments of the exhaust aftertreatment mounting interface 1, the first aperture 5A and the second aperture 5B may comprise an elongated slot, thereby accommodating assembly tolerances, such as those along a length of the vehicle.

A fastener 8 is located between the first bushing 6A and the second bushing 6B. At least one torque-accepting device 10A and 10B, such as a nut, head or the like, is disposed at least one end of the fastener 8. Both torque-accepting device 10A and torque-accepting device 10B are shown in the Figures to facilitate understanding. Application of an appropriate torque can fix position of the aftertreatment device assembly 2 with respect to the frame 12 and thereby the vehicle.

For aftertreatment device assembly 2, the first mounting bracket 3A and the second mounting bracket 3B are attached to the aftertreatment device assembly 2. A surface of the first bushing 6A is inserted into the first aperture 7A on the frame 12. A surface of the second bushing 6B is inserted into the second aperture 7B on the frame 12. In this manner, the aftertreatment device assembly 2 is aligned to the frame 12 attached to a vehicle.

FIG. 2 shows assembled elements of the embodiment of FIG. 1. The first mounting bracket 3A and the second mounting bracket 3B are attached to the aftertreatment device assembly 2. The first bushing 6A and the first aperture 5A are aligned. Shape of the first aperture 5A facilitates this alignment. The second bushing 6B and the second aperture 5B are aligned. Shape of the second aperture 5B facilitates this alignment. The fastener 8 is inserted between the first bushing 6A and the second bushing 6B. Torque is applied to at least one of the first clamping device 10A and second clamping device 10B secure at least one of the torque-accepting device 10A and the torque accepting device 10B.

To secure the aftertreatment device assembly 2 to a vehicle, the frame 12 is connected to the vehicle. The first bushing 6A is disposed in the first aperture 7A on the frame 12. The second bushing 6B is disposed in the second aperture 7B on the frame 12. The aftertreatment device assembly 2 is moved such that the first aperture 5A aligns with the first aperture 7A and the second aperture 5B aligns with the second bushing 6B. In some embodiments of the aftertreatment device assembly 2 comprising the first bracket 3A and the second bracket 3B can be substantially simultaneously aligned with respect to the first bushing 6A and the second bushing 6B. This alignment is facilitated by shape of portion of the first bushing 6A and the first aperture 5A and shape of portions of the second bushing 6B and the second aperture 6B.

The fastener 8 is inserted through the first aperture 5A in the first support 3A and second aperture 5B in the second support 3B. A torque accepting device 10A and/or 10B, such as a nut or the like, is deposited at one end of the fastener 8. The torque-accepting device 10A and/or 10B is rotated to secure the aftertreatment device assembly 2 to the frame 12. In some embodiments, the torque accepting device 10B may be joined, such as by welding and the like, with the frame 12.

What is claimed is:

1. An exhaust aftertreatment interface comprising:
   aftertreatment device assembly;
   a first mounting bracket attached to the aftertreatment device assembly;
   a second mounting bracket attached to the aftertreatment device assembly;
   a first aperture disposed on the first mounting bracket;
   a second aperture disposed on the second mounting bracket;
   a first bushing disposed in the first aperture;
   a second bushing disposed in the second aperture; and
   a fastener disposed through the first bushing and the second bushing.

2. The exhaust aftertreatment interface of claim 1 further comprising:
   a shape included on the first aperture that corresponds to a shape on the first bushing.

3. The exhaust aftertreatment interface of claim 1 further comprising:
   a shape included on the second aperture that corresponds to a shape on the second bushing.

4. The exhaust aftertreatment interface of claim 1 further comprising:
   a fastener disposed between the first bushing and the second bushing.

5. The exhaust aftertreatment interface of claim 4 further comprising:
   a torque-accepting device disposed on the fastener.

* * * * *